(No Model.)
G. WESTINGHOUSE, Jr.
SYSTEM OF ELECTRICAL DISTRIBUTION.
No. 399,639. Patented Mar. 12, 1889.
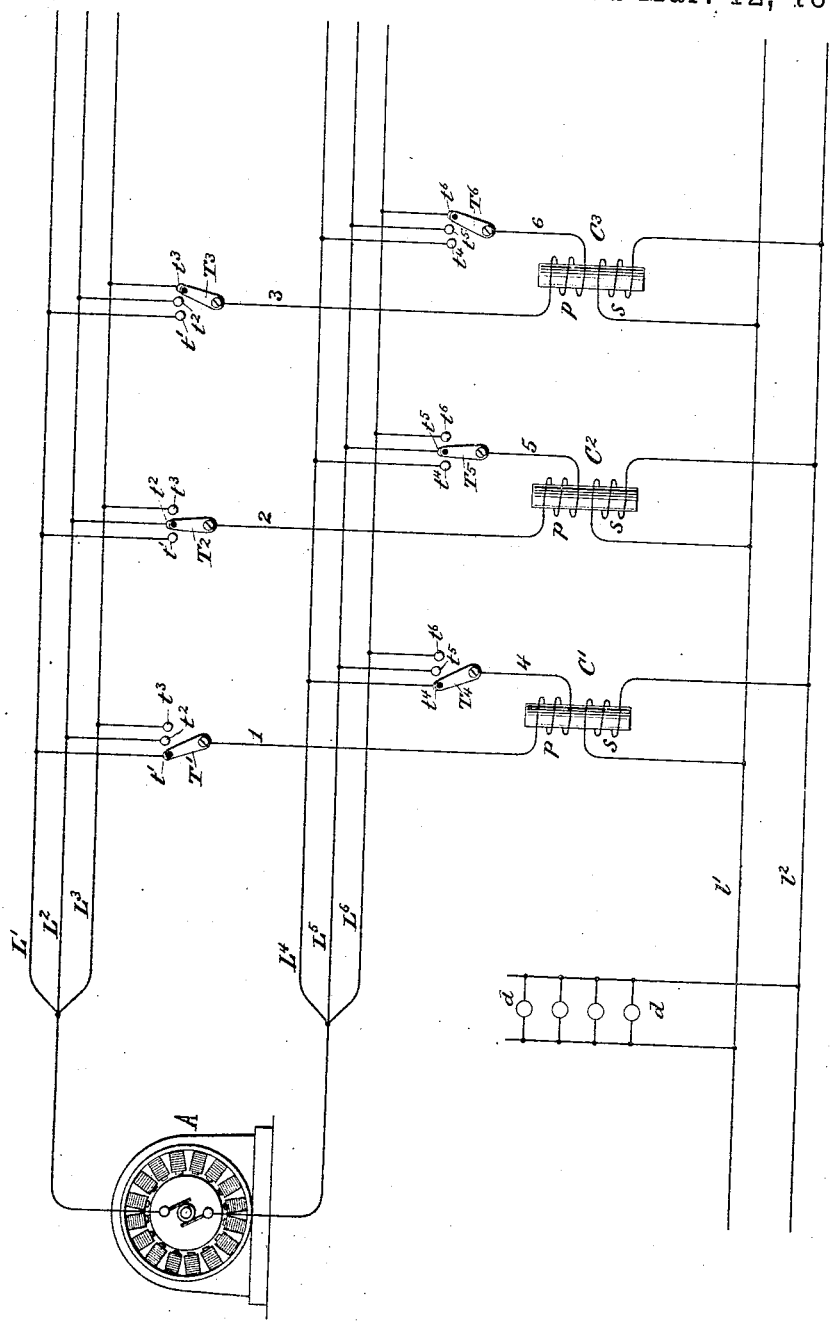

UNITED STATES PATENT OFFICE.

GEORGE WESTINGHOUSE, JR., OF PITTSBURG, PENNSYLVANIA.

SYSTEM OF ELECTRICAL DISTRIBUTION.

SPECIFICATION forming part of Letters Patent No. 399,639, dated March 12, 1889.

Application filed November 23, 1886. Serial No. 219,639. (No model.) Patented in England July 12, 1887, No. 9,739; in Germany July 12, 1887, No. 43,129; in France July 12, 1887, No. 184,742; in Belgium July 12, 1887, No. 78,173, and in Canada November 10, 1887, No. 27,975.

*To all whom it may concern:*

Be it known that I, GEORGE WESTINGHOUSE, Jr., a citizen of the United States, residing in Pittsburg, county of Allegheny, and State of Pennsylvania, have invented certain new and useful Improvements in Systems of Electrical Distribution, (patented in England July 12, 1887, No. 9,739; in Germany July 12, 1887, No. 43,129; in France July 12, 1887, No. 184,742; in Belgium July 12, 1887, No. 78,173, and in Canada November 10, 1887, No. 27,975,) of which the following is a specification.

The invention relates to the class of electric circuits employed for supplying currents from any convenient source of electricity to translating devices located at more or less distant points.

The object of the invention is especially to provide means for supplying the required currents in such a manner that should there be any interruption in the connection of any given supply-conductor there will be convenient means at hand for substituting therefor or interchanging therewith another supply-conductor, thus providing a path for the currents until the original circuits are repaired.

The invention relates especially to the system of electrical distribution in which alternating electric currents are transmitted over main conductors to points near the stations at which they are to be utilized, at which stations electric converters are employed for transforming the currents.

In the accompanying drawing there is shown, in diagram, a system of circuits involving the features of the invention.

Referring to the figure, A represents an electric generator of any suitable type adapted to produce in this instance alternating currents. The currents of one character are simultaneously transmitted upon a series of—in this instance three—main lines $L'$ $L^2$ $L^3$. Simultaneously currents of the opposite character are transmitted upon three other lines, $L^4$ $L^5$ $L^6$. These lines are adapted to carry currents of, say, two thousand volts each, and they extend near each other to points in the district where it is intended to use the currents for operating the incandescent lights $d$ $d$ $d$ or other suitable translating devices. The devices are connected in circuit with two distributing-conductors, $l'$ $l^2$, and these conductors are supplied with other currents from the main lines through intervening converters $C'$ $C^2$ $C^3$. The primary coil $p$ of the converter $C'$ is connected in circuit between main-line conductors $L'$ and $L^4$ by means of conductors 1 and 4. The converter $C^2$ is connected in circuit between the lines $L^2$ and $L^5$ in the same manner by the conductors 2 and 5, and the primary coil $p$ of the third converter, $C^3$, is connected by the conductors 3 and 6 with the remaining pair, $L^3$ and $L^6$, of the main lines. In this manner each converter is connected with a different pair of main lines. The secondary coils $s$ $s$ $s$ of the respective converters are connected in multiple arc with the lines $l'$ and $l^2$. The conductors $L'$ $L^2$, &c., thus combine to supply the conductors $l'$ and $l^2$. The conductors 1, 2, and 3, leading from the lines $L'$, $L^2$, and $L^3$, are respectively provided with switches $T'$, $T^2$, and $T^3$, each provided with three points, $t'$, $t^2$, and $t^3$, respectively connected with the three lines $L'$, $L^2$, and $L^3$. By this means each conductor 1, 2, and 3 may be connected with either of the three lines. The conductors 4, 5, and 6 are likewise constructed with switches $T^3$, $T^4$, and $T^5$, respectively. These switches are each provided with contact-points $t^4$, $t^5$, and $t^6$, connected with the lines $L^4$, $L^5$, and $L^6$, respectively. Upon the interruption of the connections of any line $L'$ $L^2$ $L^3$, &c., the corresponding converter, $C'$, $C^2$, or $C^3$, connected therewith, could be connected with one of the other of the conductors upon the same side of the system, and the currents required would therefore be delivered through that main line to the converter originally connected therewith, as well as to the additional converter thus connected in circuit, the capacity of the line being such as to convey the current required more or less perfectly. In this manner if any one conductor fails the supply of the lines $l'$ $l^2$ is kept up by the other lines until the defective line is restored.

I claim as my invention—

1. The combination, with a source of electricity, of multiple conductors extending from the respective poles, a series of converters having their primary coils respectively connected with different pairs of said conductors, and a single pair of distributing-conductors with which the secondary coils are connected in multiple arc.

2. The combination, with a source of electricity, of two or more conductors leading from the respective poles thereof, two or more converters having their primary coils respectively connected with different pairs of conductors thus formed, and translating devices connected in multiple arc with the several secondary coils of said converters.

3. The combination, with an alternate-current electric generator, of two or more main lines extending from each pole, translating devices, distributing-conductors with which said devices are connected, and means for supplying currents to said distributing-conductors from the different pairs of main lines.

4. The combination of a source of alternating electric currents, a series of main lines extending from each pole thereof, a series of converters, conductors including the respective primary coils of the same, switches applied to one terminal of each of said conductors, and contact-points applied to each switch connected with the respective main lines leading from one pole of the source.

5. The combination of a source of alternating electric currents, a series of main lines extending from one pole thereof, a series of converters, conductors leading from said main lines and including the respective primary coils of the same, switches applied to one terminal of each of said conductors, and contact-points applied to each switch connected with the respective main lines and connections from the remaining terminals of said conductors with the remaining pole of said source.

6. The combination, with the primary coil of an electric converter, of pairs of supply-conductors, means for supplying currents of electricity thereto, and a circuit-controller through which connections with the different pairs of conductors are secured.

7. The combination, with the primary circuit of an electric converter, of multiple mains and circuit-controlling devices for connecting any pair of said mains to said primary circuit.

In testimony whereof I have hereunto subscribed my name this 15th day of November, A. D. 1886.

GEO. WESTINGHOUSE, JR.

Witnesses:
    DANL. W. EDGECOMB,
    CHARLES A. TERRY.